(12) United States Patent
Leung et al.

(10) Patent No.: US 8,497,611 B2
(45) Date of Patent: Jul. 30, 2013

(54) MOTOR END FRAME

(75) Inventors: Ngan Fai Leung, Vandalia, OH (US); Frank Edward Staigl, III, Greenville, OH (US)

(73) Assignee: Regal Beloit America, Inc., Beloit, WI (US)

( * ) Notice: Subject to any disclaimer, the term of this patent is extended or adjusted under 35 U.S.C. 154(b) by 285 days.

(21) Appl. No.: 13/092,240

(22) Filed: Apr. 22, 2011

(65) Prior Publication Data
US 2012/0267972 A1  Oct. 25, 2012

(51) Int. Cl.
*H02K 11/00* (2006.01)
(52) U.S. Cl.
USPC .............................................. 310/71; 310/90
(58) Field of Classification Search
USPC .......................... 310/71, 89–90, 91, 400–411
See application file for complete search history.

(56) References Cited

U.S. PATENT DOCUMENTS

| | | |
|---|---|---|
| 3,231,767 A | 1/1966 | Powell |
| 3,759,019 A | 9/1973 | Wells |
| 3,983,428 A | 9/1976 | Bitsch et al. |
| 4,116,410 A | 9/1978 | Boyd, Jr. et al. |
| 4,297,627 A | 10/1981 | Schaefer |
| 4,306,168 A | 12/1981 | Peachee |
| 4,361,953 A | 12/1982 | Peachee |
| 4,362,065 A | 12/1982 | Baratti |
| 4,636,617 A | 1/1987 | Petersen et al. |
| 4,687,977 A | 8/1987 | Brahmavar et al. |
| 4,748,355 A | 5/1988 | Anderson et al. |
| 4,877,984 A | 10/1989 | Colwell et al. |
| 4,937,482 A | 6/1990 | Dohogne |
| 5,006,742 A * | 4/1991 | Strobl et al. ..................... 310/88 |
| 5,015,894 A | 5/1991 | Crow et al. |
| 5,017,818 A | 5/1991 | Dohogne |
| 5,076,762 A | 12/1991 | Lykes et al. |
| 5,519,273 A | 5/1996 | Keck |
| 5,543,671 A * | 8/1996 | Williams ......................... 310/71 |
| 5,821,674 A * | 10/1998 | Weiner ......................... 310/68 D |
| 6,040,646 A * | 3/2000 | Peters ............................. 310/71 |
| 6,048,219 A | 4/2000 | Kotowski |

(Continued)

FOREIGN PATENT DOCUMENTS

| | | |
|---|---|---|
| EP | 0655822 | 5/1995 |
| EP | 0961358 | 12/1999 |
| JP | 3308124 | 8/1996 |

OTHER PUBLICATIONS

Franklin Pump Systems Owner's Manual; Jul. 2005; 8 pgs.

(Continued)

*Primary Examiner* — Thanh Lam
(74) *Attorney, Agent, or Firm* — Michael Best & Friedrich LLP (57) ABSTRACT

An end-frame of an electro-dynamic machine includes a bearing housing defining an annular bearing cavity for rotatably supporting a rotor shaft about an axis. A support body is coupled to the bearing housing. The support body has a terminal end and a base end opposite the terminal end. The base end includes a first radial support surface having a first diameter, a second radial support surface having a second diameter, and an annular wall axially disposed between the first radial support surface and the second radial support surface. A radial extension extends radially from the support body adjacent the terminal end. A mounting member extends axially from the radial extension portion. The mounting member defines an aperture for receiving a BX fitting.

20 Claims, 13 Drawing Sheets

U.S. PATENT DOCUMENTS

| | | | |
|---|---|---|---|
| 6,133,658 A * | 10/2000 | Fisher et al. | 310/89 |
| 6,261,115 B1 | 7/2001 | Pederson et al. | |
| 6,378,849 B1 | 4/2002 | Erdman et al. | |
| 6,504,280 B2 | 1/2003 | Trowbridge | |
| 6,657,338 B2 * | 12/2003 | Fisher et al. | 310/89 |
| 6,664,678 B2 | 12/2003 | Shimizu | |
| 6,731,036 B2 | 5/2004 | Ghiotto | |
| 6,831,382 B1 | 12/2004 | Lyle et al. | |
| 6,879,070 B2 | 4/2005 | Leany et al. | |
| 6,882,070 B2 * | 4/2005 | Staigl et al. | 310/71 |
| 7,042,122 B1 | 5/2006 | Dufala et al. | |
| 7,492,071 B2 | 2/2009 | Chaohai et al. | |
| 7,586,231 B2 | 9/2009 | Wang et al. | |
| 7,696,656 B2 * | 4/2010 | Ragnone et al. | 310/51 |
| 7,811,115 B1 | 10/2010 | Tyler | |
| 7,898,131 B2 | 3/2011 | Staigl, III et al. | |
| 2003/0141771 A1 | 7/2003 | Leany et al. | |
| 2004/0164643 A1 | 8/2004 | Ortt et al. | |
| 2006/0214524 A1 * | 9/2006 | Kashihara et al. | 310/68 D |
| 2007/0176500 A1 * | 8/2007 | Watkins et al. | 310/68 R |
| 2010/0237722 A1 | 9/2010 | Schmidt et al. | |
| 2010/0270880 A1 | 10/2010 | Jia et al. | |
| 2010/0320853 A1 | 12/2010 | Isogai et al. | |
| 2010/0326605 A1 | 12/2010 | Guillen Chico | |

OTHER PUBLICATIONS

Pump Motors, A.O. Smith Corporation: 2001: 52 pgs.

* cited by examiner

MOTOR END FRAME

BACKGROUND

The present invention relates to electric motors. More particularly, the invention relates to an electric motor that includes an end frame.

SUMMARY

In one embodiment, the invention provides an end-frame of an electro-dynamic machine. The end-frame includes a bearing housing defining an annular bearing cavity for rotatably supporting a rotor shaft about an axis. A support body is coupled to the bearing housing. The support body has a terminal end and a base end opposite the terminal end. The base end includes a first radial support surface having a first diameter, a second radial support surface having a second diameter, and an annular wall axially disposed between the first radial support surface and the second radial support surface. A radial extension extends radially from the support body adjacent the terminal end. A mounting member extends axially from the radial extension portion. The mounting member defines an aperture for receiving a BX fitting.

In another embodiment, the invention provides an electro-dynamic machine. The electro-dynamic machine includes a rotor shaft extending along an axis. A first end frame rotatably supports the rotor shaft at a first axial position. A substantially cylindrical main frame member is coaxially disposed about the rotor shaft frame and has a first end and a second end. The first end is coupled to the first end frame. The main frame has one of a first diameter and a second diameter. A bearing housing defines an annular bearing cavity for rotatably supporting the rotor shaft at a second axial position. A first support member is disposed radially outwardly of the bearing housing. The first support member includes a first radial support surface for engaging the second end of the main frame member. A second support member is disposed radially outwardly of the first support member and axially displaced from the first support member. The second support member includes a cylindrical body with a terminal end and a base end opposite the terminal end. The base end includes a second radial support surface for engaging the second end of the main frame member. A radial extension portion extends radially from the cylindrical body. A mounting member extends axially from the radial extension portion. The mounting member defines an aperture for receiving a BX fitting.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
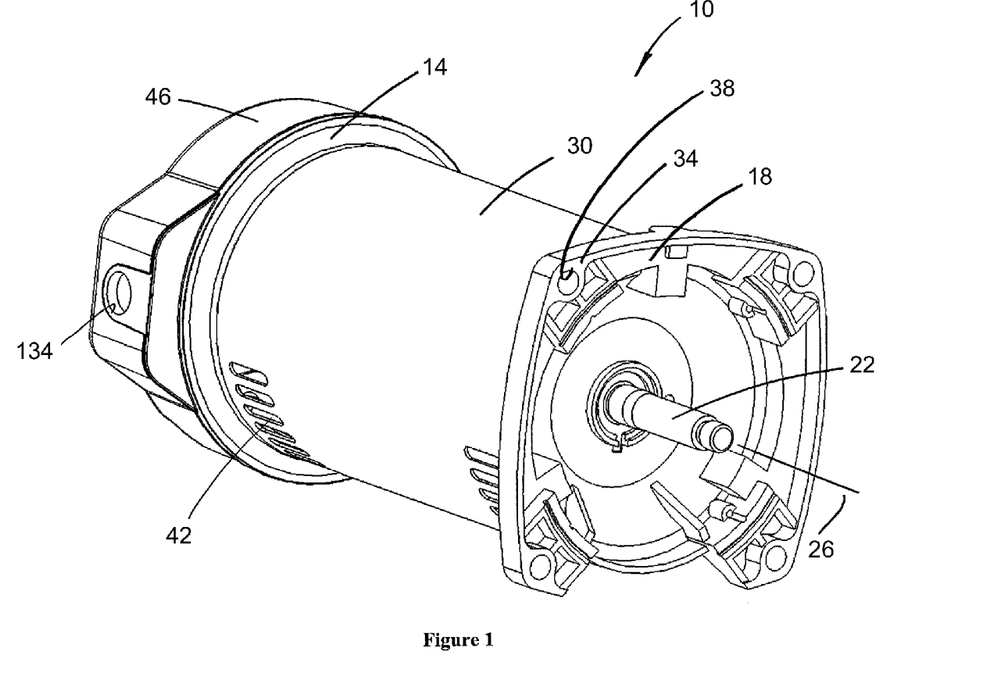
FIG. 1 is a bottom perspective of a motor assembly according to one aspect of the invention.
Figure 14:
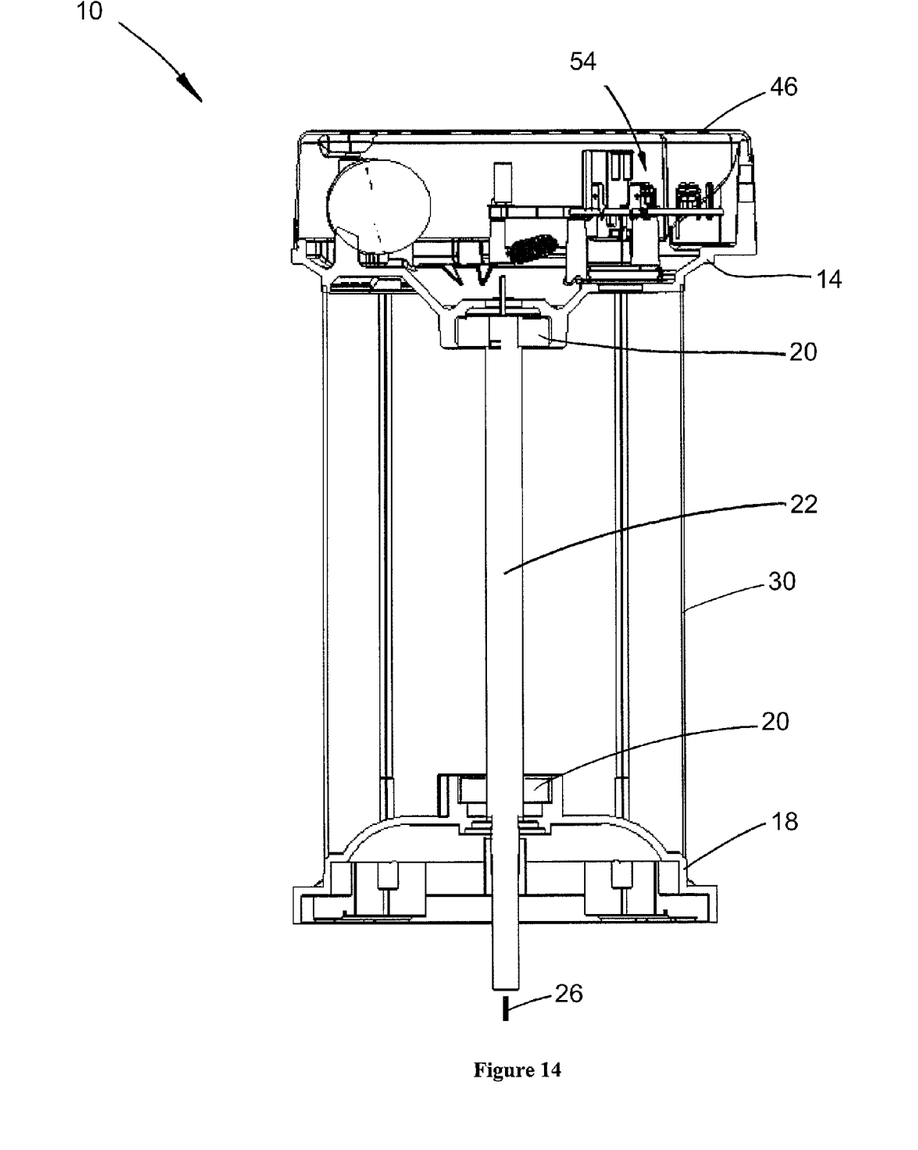
FIG. 14 is a cross-sectional view of the motor assembly of FIG. 1.

FIG. 1 is a bottom perspective view of an electro-dynamic machine, more specifically an electric motor 10. The electric motor 10 includes an end frame 14 and an opposite end frame 18. As shown in FIG. 14, a rotor shaft 22 is rotatably supported by bearings 20 disposed within the end frame 14 and opposite end frame 18. The rotor shaft 22 supports a rotor for rotation about an axis 26. The rotor rotates relative to a stator. A main frame 30 is disposed between the end frame 14 and the opposite end frame 18 and encloses the stator. Referring back to FIG. 1, the opposite end frame 18 include a mounting flange 34 for mounting the motor 10 to a load such as a pump, fan, or compressor. The mounting flange 34 includes a plurality of mounting apertures 38 for receiving bolts or studs for mounting the load. The main frame 30 includes ventilation louvers 42 for providing a flow of cooling air to the rotor and stator.

Figure 2:
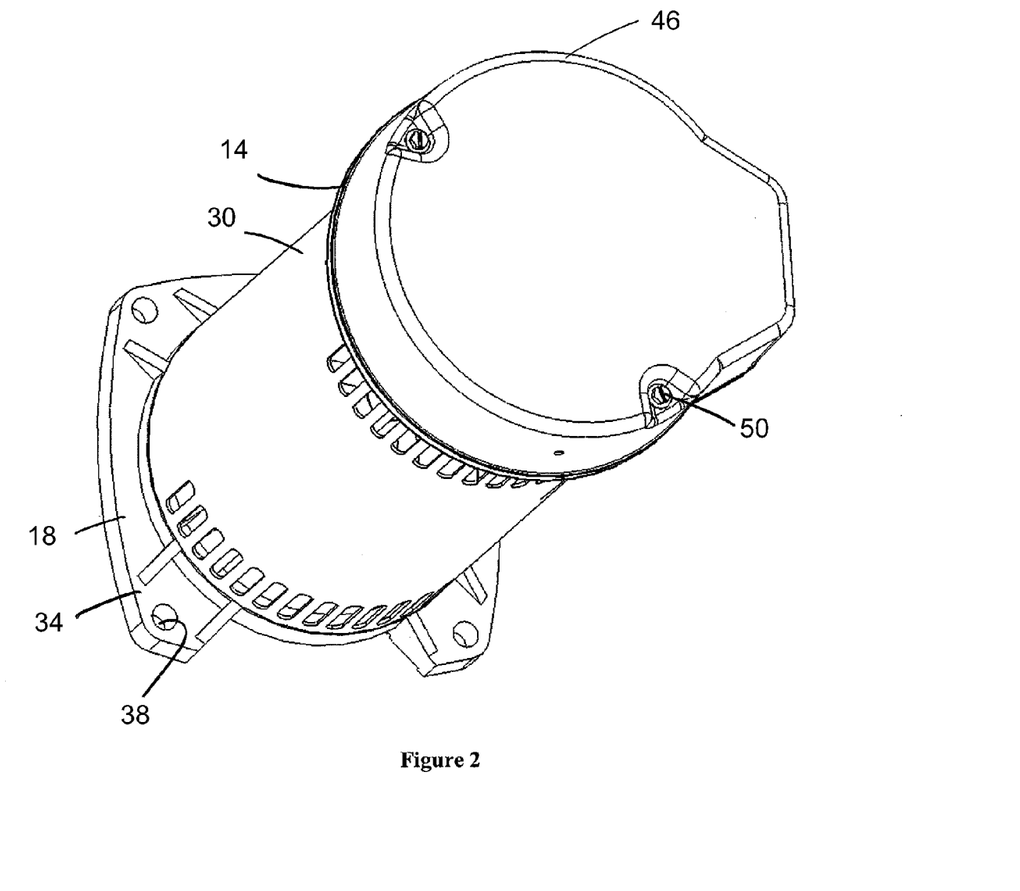
FIG. 2 is a top perspective view of the motor assembly of FIG. 1.

As shown in the top view of FIG. 2, the end frame 14 is substantially enclosed by a terminal canopy 46. The terminal canopy 46 is fastened to the end frame 14 by a plurality of threaded fasteners 50. The terminal canopy 46 may additionally be coupled to the end frame by a resilient flange, latch, or other coupling means. The terminal canopy 46 is configured to provide a degree of water resistance to underlying electrical components 54 that are coupled to the end frame 14 (see FIGS. 8 and 14). The terminal canopy 46 may also substantially reduce the entrance of insects, rodents and other potential pests that may damage electrical components 54 of the motor 10.

Figure 3:
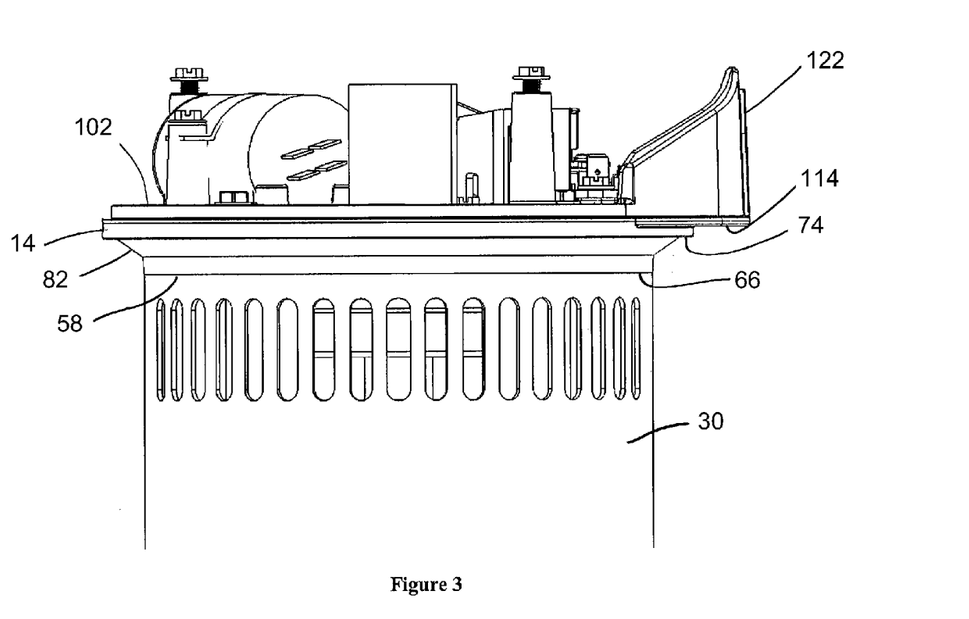
FIG. 3 is a side view of a portion of the motor assembly of FIG. 1.
Figure 4:
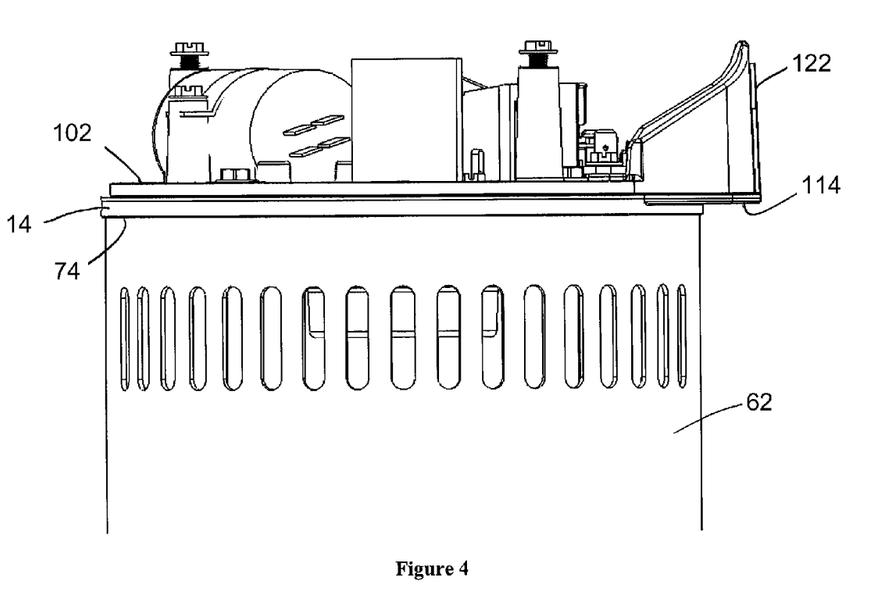
FIG. 4 is a side view of a portion of a motor assembly with an alternative main frame.

FIGS. 3 and 4 are side views of a portion of the electric motor 10, with the terminal canopy 46 removed. A base end 58 of the end frame 14 is configured such that the end frame 14 may be used with main frames and/or stator laminations of multiple frame sizes. For example, FIG. 3 illustrates the end frame 14 with an exemplary "48 frame" main frame 30. FIG. 4 illustrates the end frame 14 with an exemplary "56 frame" main frame 62. As those of skill in the art will appreciate, the two digit frame number is based on the shaft height in sixteenths of an inch. Therefore, a 48 frame motor will have a shaft height of 48÷16=3 inches. A 56 frame motor would have a shaft height of 3½ inches.

Figure 5:
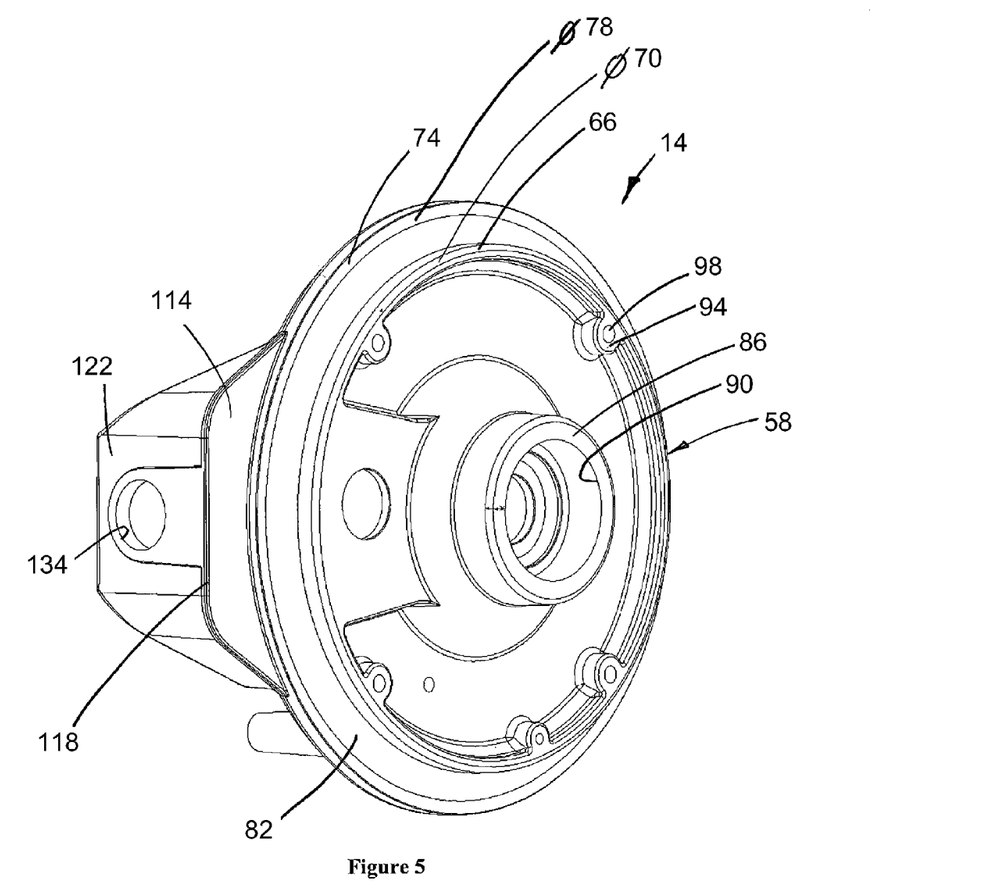
FIG. 5 is a bottom perspective view of an end frame casting.

As best illustrated in FIG. 5, the end frame 14 can accommodate different main frames 30 and 62 because the base end 58 has a first radial mating surface 66 with a first diameter 70, and a second radial mating surface 74 with a second diameter 78. A frustoconical wall 82 extends from the first radial mating surface 66 to the second radial mating surface 74. As shown in FIG. 3, when a 48 frame main frame 30 is used, the main frame 30 engages the first radial mating surface 66 and the frustoconical wall 82 is disposed outside of the mainframe 30. As shown in FIG. 4, when a 56 frame main frame 62 is used, the mainframe 62 engages the second radial mating surface 74 and the frustoconical wall 82 is disposed within the mainframe 62.

Referring back to FIG. 5, a cylindrical wall 86 extends axially from the base end 58 of the end frame 14. The cylindrical wall 86 defines a bearing cavity 90 for receiving the rotor shaft bearing. Mounting bosses 94 are disposed radially inwardly of the first radial mating surface 66. The mounting bosses 94 define a first plurality of bolt apertures 98 for receiving thru-bolts.

Figure 6:
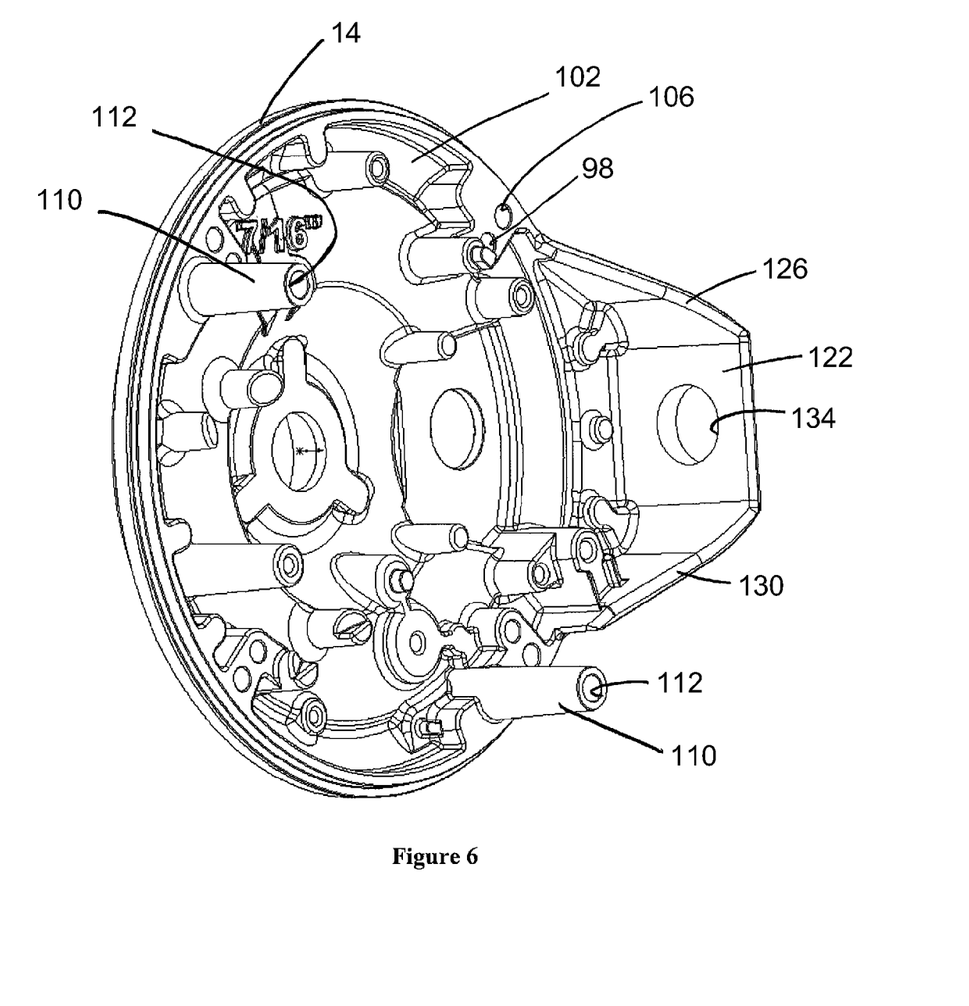
FIG. 6 is a top perspective view of an end frame casting.

As illustrated in FIG. 6, which is a perspective of a terminal end 102 of the end frame 14, the first plurality of bolt apertures 98 pass through the end frame 14 axially. The first plurality of bolt apertures 98 may be provided, for example, for receiving assembly bolts for coupling a 48 frame main frame 30 to the end frame 14. A second plurality of bolt apertures 106 are defined in the end frame 14 radially outwardly of the first plurality of bolt apertures 98.

In most constructions, the end frame 14 may be formed by casting. In one construction, the first plurality of bolt apertures 98 are cast through, while the second plurality of bolt apertures 106 are cast with a thin wall enclosing a bottom of the bolt apertures 106 (i.e., the second plurality of bolt apertures 106 visible in FIG. 6 do not pass through to the base end 58, and therefore are not visible in FIG. 5). The end frame 14 may be formed this way such that in 48 frame applications, the second plurality of bolt apertures 106 do not provide a path for water intrusion into the end frame 14 and under canopy 46 (FIG. 2). If the end frame 14 is used for 56 frame applications, the second plurality of bolt apertures 106 can be opened as an additional step of assembly and manufacture.

Figure 7:
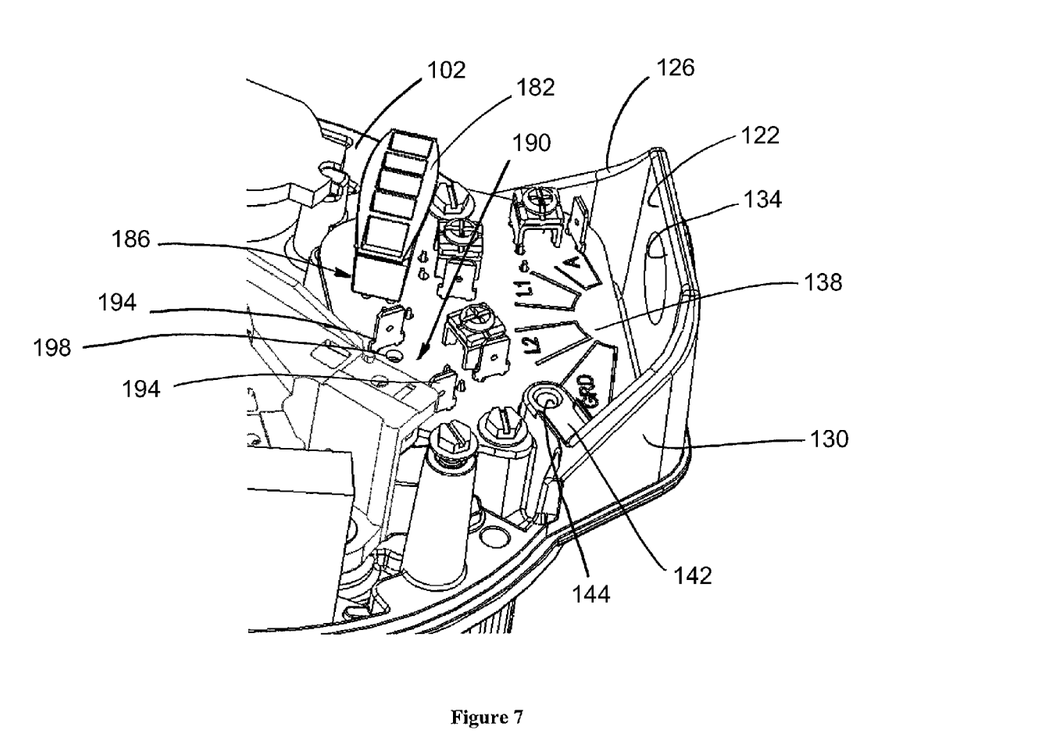
FIG. 7 is a perspective view of a portion of the motor assembly of FIG. 1.

FIG. 6 illustrates additional features of the terminal end 102 of the end frame 14. Canopy bosses 110 extend axially from the terminal end 102. The bosses 110 define threaded apertures 112 for receiving the canopy fasteners 50. The terminal end 102 is normally covered by the canopy 46 when the motor is installed. The terminal end 102 is substantially circular (see FIG. 8), with a radial extension 114 that extends outwardly radially beyond the second radial mating surface 74 (see FIG. 3). As best shown in FIG. 5, a distal end 118 of the radial extension 114 includes an axially extending mounting wall 122. Turning to FIGS. 6 and 7, the mounting wall 122 is supported by a first axial support wall 126 and a second axial support wall 130. The first axial support wall 126 and second axial support wall 130 provide increased rigidity to the mounting wall 122.

Referring to FIGS. 6 and 7, the mounting wall 122 defines a circular aperture 134. The circular aperture 134 is provided as a mounting point for a BX fitting (or other armored cable fitting), and therefore can be described as a BX aperture 134.

The perspective view of FIG. 7 shows the relationship between the BX aperture 134 and a terminal board 138. The BX aperture 134 is axially displaced above the terminal board 138. This arrangement allows for improved ease of installation of threaded connectors during installation of the motor assembly. Raising the BX aperture 134 above the terminal board 138 allows room for wires to bend and maneuver when a technician makes power connections. The increased clearance allows for tools or fingers to be more easily used to shape wires and to connect to the terminal board 138. As also illustrated in FIG. 7, a ground wire boss 142 disposed on the terminal end 102 is raised axially above the adjacent terminal board 138. The ground wire boss 142 defines a threaded aperture 144 for receiving a ground wire screw.

Figure 8:
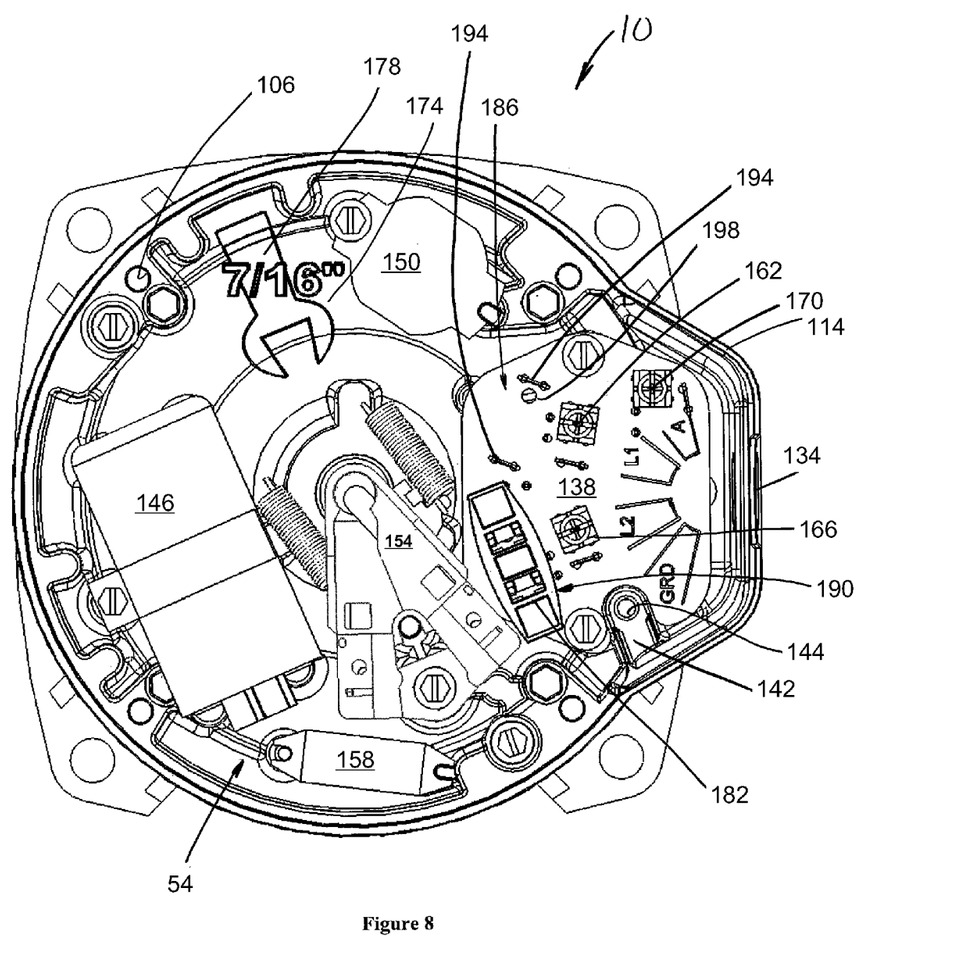
FIG. 8 is a top view of a portion of the electric motor assembly of FIG. 1 according to one aspect of the invention.

FIG. 8 is a top view of the electric motor 10, illustrating the arrangement of electrical components 54 on the end frame 14. The terminal end 102 of the end frame accommodates the terminal board 138, a starting capacitor 146, an overload protector circuit 150, a centrifugal switch and governor assembly 154, and a two-speed relay 158. The centrifugal switch and governor assembly 154 regulates a speed at which the starting capacitor is electrically coupled or decoupled from other portions of a motor circuit that includes the overload protector circuit 150 and the terminal board 138.

The radial extension 114 accommodates the terminal board 138 in order to allow for several improvements. The terminal board 138 configuration, in combination with the ground wire boss 142 location, allows a ground lead to be approximately the same length from the BX aperture 134 as leads to an L1 terminal 162, an L2 terminal 166, and a low speed terminal 170. This arrangement requires a shorter length of wire to use for connections and allows for a cleaner finished wire lead routing scheme, which may be faster to install and/or disassemble. Additionally, this arrangement makes a replacement motor easier to install where the power leads are carried over from the original installation. As also illustrated in FIG. 8, the radial extension 114 frees-up space within the end frame 14 to accommodate the 2-speed relay 158, even in installations using a 48 frame. With the additional space provided by the radial extension 114, clearance is also provided to insert a wrench for easy access to the rotor shaft during, for example, pump impeller installation and removal. An area of wrench access 174 is identified by a logo 178 that includes identifying information of the proper wrench size to engage flats on the rotor shaft.

The terminal board 138 illustrated in FIG. 7 includes a voltage change plug 182 inserted into a high voltage position 186 (e.g., 230 V) of the terminal board 138. FIG. 8 illustrates the voltage change plug inserted into a low voltage position 190 (e.g., 115 V) of the terminal board 138. The voltage change plug positions 186 and 190 are configured such that a force to change from a high voltage to a low voltage is the same as that required to change from a low voltage to a high voltage. In some embodiments, a single voltage change plug 182 illustrated in FIGS. 12 and 13 may be repositioned from the high voltage position 186 to the low voltage position 190 and vice versa in order to change the operating voltage of the motor 10. The voltage change plug 182 is used to manipulate the connection/configuration of the motor windings so that a single motor design can be connected for either 'high' or 'low' voltage with a single operation without adjusting the line leads Each of the high voltage position 186 and the low voltage position 190 of the terminal board 138 includes two spade (male) terminals 194. A pin aperture 198 is defined by the terminal board 138 at each of the high voltage position 186 and the low voltage position 190.

Figure 12:
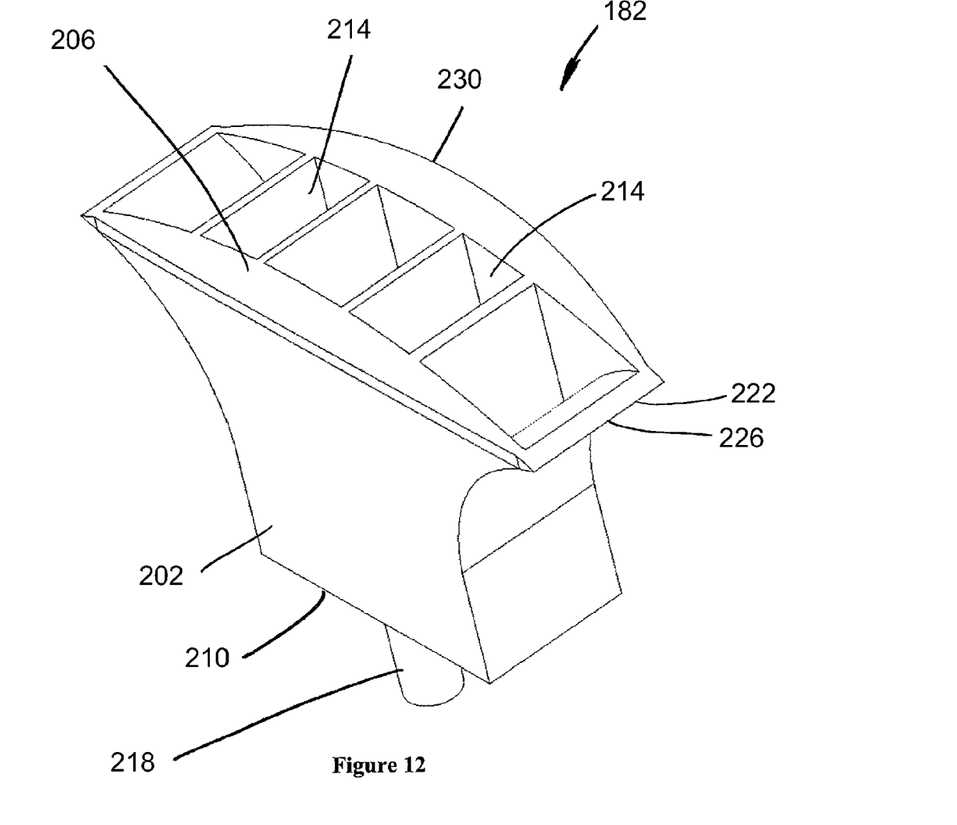
FIG. 12 is a top perspective view of a voltage change plug.
Figure 13:
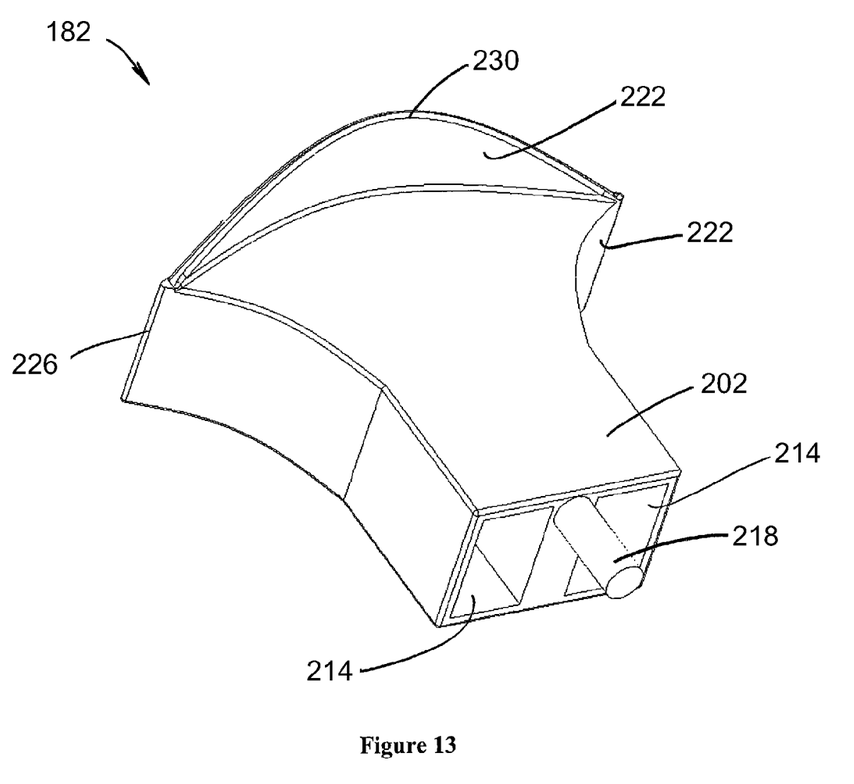
FIG. 13 is a bottom perspective view of a voltage change plug.

FIGS. 12 and 13 are perspective views of a voltage change plug 182. The voltage change plug 182 includes a substantially rectangular body 202. The rectangular body 202 has a handle end 206 and a mating end 210. The rectangular body 202 defines a pair of channels 214 for receiving the spade terminals 194 (FIGS. 7 and 8). A guide pin 218 extends from the mating end 210 for engaging the pin apertures 198 (FIGS. 7 and 8). To reduce mis-connection of the voltage change plug 182, finger extensions 222 extend from lateral sides 226 and longitudinal sides 230 of the rectangular body 202. The finger extensions 222 provide a technician or other user with a surface to grip in order to remove or reposition the voltage change plug 182.

Referring back to FIGS. 7 and 8, the voltage change plug 182 may be preassembled to either the high voltage position 186 or the low voltage position 190. During installation of the motor 10, the technician will connect power leads to terminals 162, 166, and/or 170, depending on the motor electrical type from BX aperture 134. After connecting power, the technician will look at the factory pre-set location for voltage change plug 182 and determine if it is set correctly for the incoming voltage from power leads 162, 166, and/or 170. If it is correct, the technician does not reposition the plug 182. If it is incorrect, the technician removes the plug 182 from either the high voltage position 186 and the low voltage position 190 (pulls away from terminal board 138) and places the plug 138 on the other high voltage position 186 and the low voltage position 190.

Figure 9:
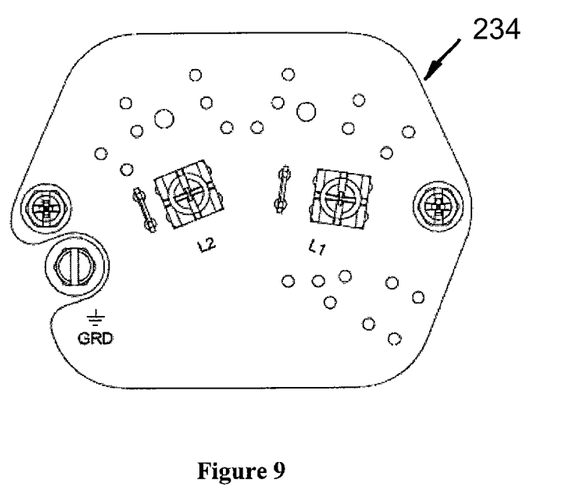
FIG. 9 is a top view of a terminal board according to another aspect of the invention.
Figure 10:
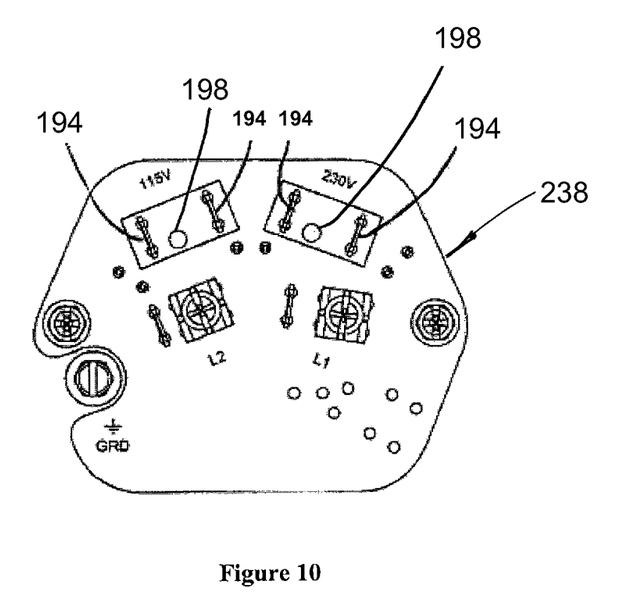
FIG. 10 is a top view of a terminal board according to yet another aspect of the invention.
Figure 11:
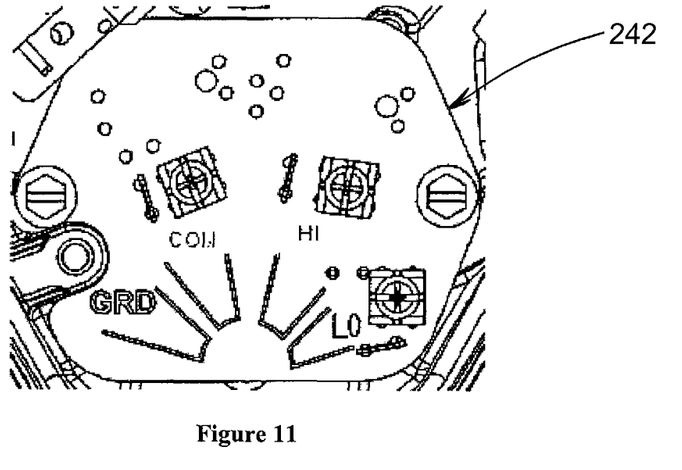
FIG. 11 is a top view of a terminal board according to still yet another aspect of the invention.

FIGS. 9, 10, and 11 illustrate various alternative terminal board configurations which may be used with the end frame 14. FIG. 9 illustrates a single voltage, single speed terminal board 234. FIG. 10 illustrates a dual voltage (e.g., 115 volt and 230 volt version), single speed terminal board 238 without a voltage change plug 182 attached. Spade terminals 194 and pin apertures 198, similar to those of the terminal board 138 (FIGS. 7 and 8), are illustrated. FIG. 11 illustrates a single voltage, two speed terminal board 242.

Thus, the invention provides, among other things, an end frame for an electric motor. Various features and advantages of the invention are set forth in the following claims.

What is claimed is:

1. An electro-dynamic machine comprising:
a rotor shaft extending along an axis;
a first end frame rotatably supporting the rotor shaft at a first axial position;
a substantially cylindrical main frame member coaxially disposed about the rotor shaft frame and having a first end and a second end, the first end coupled to the first end frame, the main frame having one of a first diameter and a second diameter;
a bearing housing defining an annular bearing cavity for rotatably supporting the rotor shaft at a second axial position;
a first support member disposed radially outwardly of the bearing housing, the first support member including a first radial support surface for engaging the second end of the main frame member;
a second support member disposed radially outwardly of the first support member and axially displaced from the first support member, the second support member including a cylindrical body with a terminal end, a base end opposite the terminal end, the base end including a second radial support surface for engaging the second end of the main frame member and a radial extension portion extending radially from the cylindrical body; and
a mounting member extending axially from the radial extension portion, the mounting member defining an aperture for receiving a BX fitting.

2. The electro-dynamic machine of claim 1, further comprising a terminal board coupled to the terminal end.

3. The electro-dynamic machine of claim 2, wherein the aperture is axially displaced a non-zero distance from the terminal board.

4. The electro-dynamic machine of claim 2, further comprising a ground wire boss extending axially outwardly from the terminal end, the ground wire boss defining a ground screw aperture axially above and parallel to the terminal board.

5. The electro-dynamic machine of claim 2, wherein the terminal board is user configurable for operation at a first voltage and a second voltage.

6. The electro-dynamic machine of claim 5, wherein the terminal board is configured to receive a voltage change plug in a first position corresponding to the first voltage and a second position corresponding to the second voltage.

7. The electro-dynamic machine of claim 1, wherein the bearing housing, the first support member, the second support member, and the mounting member at least partially define a second end-frame.

8. The electro-dynamic machine of claim 1, wherein the first radial support surface has a third diameter corresponding to the first diameter.

9. The electro-dynamic machine of claim 1, wherein the first radial support surface has a third diameter corresponding to one of the first diameter and the second diameter, and the second radial support has a fourth diameter corresponding to the other of the first diameter and the second diameter.

10. The electro-dynamic machine of claim 1, wherein the second radial support surface is axially displaced a non-zero distance from the first radial support surface.

11. The electro-dynamic machine of claim 1, wherein the first support member includes a frustoconical wall disposed between the first radial support surface and the second radial support surface.

12. An end-frame of an electro-dynamic machine, the end-frame comprising:
a bearing housing defining an annular bearing cavity for rotatably supporting a rotor shaft about an axis;
a support body coupled to the bearing housing, the support body having a terminal end, and a base end opposite the terminal end, the base end including a first radial support surface having a first diameter, a second radial support surface having a second diameter, and an annular wall axially disposed between the first radial support surface and the second radial support surface;
a radial extension extending radially from the support body adjacent the terminal end; and
a mounting member extending axially from the radial extension portion, the mounting member defining an aperture for receiving a BX fitting.

13. The end-frame of claim 12, wherein the first radial support surface is configured to engage a substantially cylindrical motor main frame having a first diameter and the second radial support surface is configured to engage a substantially cylindrical motor main frame having a second diameter.

14. The end-frame of claim 12, further comprising a terminal board coupled to the terminal end.

15. The end-frame of claim 14, further comprising a ground wire boss extending axially outwardly from the terminal end, the ground wire boss defining a ground screw aperture axially elevated above and parallel to the terminal board.

16. The end frame of claim 14, wherein the aperture is axially displaced from the terminal board.

17. The end frame of claim 14, wherein the terminal board is configured to receive a voltage change plug in a first position, corresponding to a first line voltage, and a second position, corresponding to a second line voltage.

18. The end frame claim 12, wherein the bearing housing, the support body, the radial extension, and the mounting member are formed as a single component.

19. The end frame of claim 12, further comprising a canopy coupled to the support body and substantially enclosing the terminal end.

20. The end-frame of claim 12, wherein the annular wall has a frustoconical cross section.

* * * * *